(12) United States Patent
Xu et al.

(10) Patent No.: US 12,164,505 B2
(45) Date of Patent: Dec. 10, 2024

(54) TWO-PHASE COMMIT USING RESERVED LOG SEQUENCE VALUES

(71) Applicant: VMware LLC, Palo Alto, CA (US)

(72) Inventors: Yiqi Xu, Newark, CA (US); Eric Knauft, San Francisco, CA (US); Enning Xiang, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/957,941

(22) Filed: Sep. 30, 2022

(65) Prior Publication Data

US 2024/0111755 A1    Apr. 4, 2024

(51) Int. Cl.
  *G06F 16/23*    (2019.01)
  *G06F 13/16*    (2006.01)
(52) U.S. Cl.
  CPC ...... *G06F 16/2379* (2019.01); *G06F 13/1668* (2013.01); *G06F 16/2308* (2019.01)

(58) Field of Classification Search
  CPC ............ G06F 16/2379; G06F 16/2308; G06F 16/1668
  See application file for complete search history.

(56) References Cited

U.S. PATENT DOCUMENTS

2015/0278281 A1* 10/2015 Zhang ................ G06F 16/2282
                                                                    707/703
2020/0327097 A1* 10/2020 Birka .................. G06F 16/2358

* cited by examiner

*Primary Examiner* — Loc Tran
(74) *Attorney, Agent, or Firm* — King Intellectual Asset Management

(57) ABSTRACT

System and method for managing different classes of storage input/output (I/O) requests for a two-phase commit operation in a distributed storage system assigns reserved log sequence values to each of storage I/O requests of a first class, which are added to a two-phase commit queue. The reserved log sequence values of the storage I/O requests of the first class in the two-phase commit queue are assigned to some of the storage I/O requests of the second class, which are added to the two-phase commit queue.

20 Claims, 9 Drawing Sheets

TWO-PHASE COMMIT USING RESERVED LOG SEQUENCE VALUES

BACKGROUND

A distributed storage system allows a cluster of host computers to aggregate local storage devices, which may be located in or attached to each host computer, to create a single and shared pool of storage. This pool of storage is accessible by all host computers in the cluster, including any virtualized instances running on the host computers, such as virtual machines. Because the shared local storage devices that make up the pool of storage may have different performance characteristics, such as capacity, input/output per second (IOPS) capabilities, etc.), usage of such shared local storage devices to store data may be distributed among the virtual machines based on the needs of each given virtual machine.

This approach provides enterprises with cost-effective performance. For instance, distributed storage using pooled local storage devices is inexpensive, highly scalable, and relatively simple to manage. Because such distributed storage can use commodity storage devices, e.g., disk drives, in the cluster, enterprises do not need to invest in additional storage infrastructure. However, one issue that arises with this approach relates to processing of different classes of storage input/output (I/O) requests, such as VM write requests and resynchronization (resync) write requests, in two-phase commit (2PC) operations, where one class of storage I/O requests may delay other storage IO requests from being committed. Such delays may create unfairness in I/O performance of the delayed storage I/O requests. Thus, there is a need to resolve this unfairness issue.

BRIEF DESCRIPTION OF THE DRAWINGS

Throughout the description, similar reference numbers may be used to identify similar elements.

DETAILED DESCRIPTION

Figure 1:
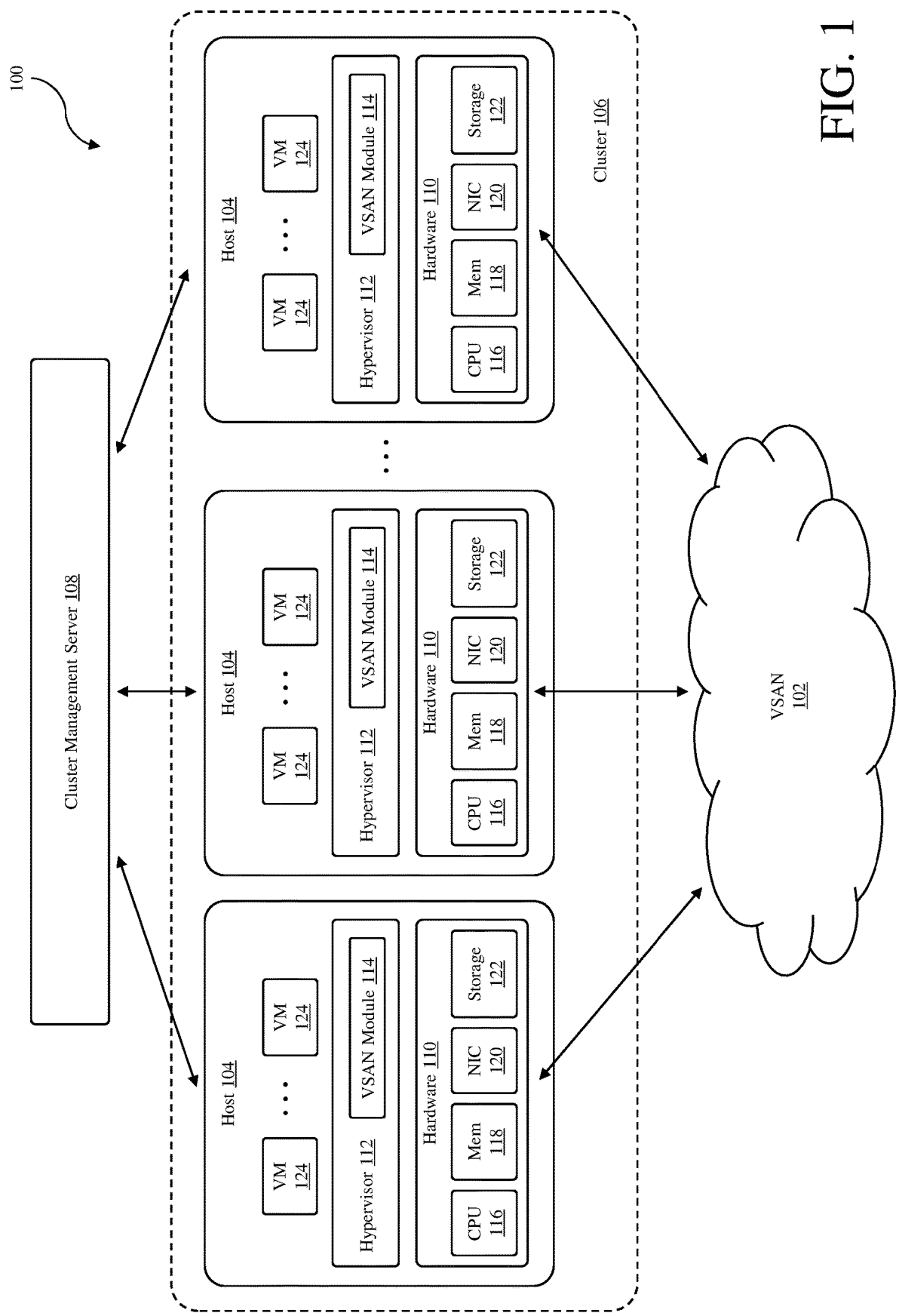
FIG. 1 is a block diagram of a distributed storage system in accordance with an embodiment of the invention.

FIG. 1 illustrates a distributed storage system 100 in accordance with an embodiment of the invention. As shown in FIG. 1, the distributed storage system 100 provides a software-based "virtual storage area network" (VSAN) 102 that leverages local storage resources of host computers 104, which are part of a logically defined cluster 106 of host computers that is managed by a cluster management server 108. The VSAN 102 allows local storage resources of the host computers 104 to be aggregated to form a shared pool of storage resources, which allows the host computers 104, including any software entities running on the host computers, to use the shared storage resources.

The cluster management server 108 operates to manage and monitor the cluster 106 of host computers. The cluster management server may be configured to allow an administrator to create the cluster 106, add host computers to the cluster and delete host computers from the cluster. The cluster management server may also be configured to allow an administrator to change settings or parameters of the host computers in the cluster regarding the VSAN 102, which is formed using the local storage resources of the host computers in the cluster. The cluster management server may further be configured to monitor the current configurations of the host computers and any virtual instances running on the host computers, for example, virtual machines (VMs). The monitored configurations may include hardware configuration of each of the host computers and software configurations of each of the host computers. The monitored configurations may also include virtual instance hosting information, i.e., which virtual instances (e.g., VMs) are hosted or running on which host computers. The monitored configurations may also include information regarding the virtual instances running on the different host computers in the cluster.

The cluster management server 108 may also perform operations to manage the virtual instances and the host computers 104 in the cluster 106. As an example, the cluster management server may be configured to perform various resource management operations for the cluster, including virtual instance placement operations for either initial placement of virtual instances and/or load balancing. The process for initial placement of virtual instances, such as VMs, may involve selecting suitable host computers for placement of the virtual instances based on, for example, memory and CPU requirements of the virtual instances, the current memory and CPU loads on all the host computers in the cluster and the memory and CPU capacity of all the host computers in the cluster.

In some embodiments, the cluster management server 108 may be a physical computer. In other embodiments, the cluster management server may be implemented as one or more software programs running on one or more physical computers, such as the host computers 104 in the cluster 106, or running on one or more virtual machines, which may be hosted on any host computers. In an implementation, the cluster management server is a VMware vCenter™ server with at least some of the features available for such a server.

As illustrated in FIG. 1, each host computer 104 in the cluster 106 includes hardware 110, a hypervisor 112, and a VSAN module 114. The hardware 110 of each host computer includes hardware components commonly found in a physical computer system, such as one or more processors 116, one or more system memories 118, one or more network interfaces 120 and one or more local storage devices 122 (collectively referred to herein as "local storage"). Each processor 116 can be any type of a processor, such as a central processing unit (CPU) commonly found in a server. In some embodiments, each processor may be a multi-core processor, and thus, includes multiple independent processing units or cores. Each system memory 118, which may be random access memory (RAM), is the volatile memory of the host computer 104. The network interface 120 is an interface that allows the host computer to communicate with a network, such as the Internet. As an example, the network interface may be a network adapter. Each local storage device 122 is a nonvolatile storage, which may be, for example, a solid-state drive (SSD) or a magnetic disk.

The hypervisor 112 of each host computer 104, which is a software interface layer that, using virtualization technology, enables sharing of the hardware resources of the host computer by virtual instances 124, such as VMs, running on the host computer. With the support of the hypervisor, the VMs provide isolated execution spaces for guest software.

The VSAN module 114 of each host computer 104 provides access to the local storage resources of that host computer (e.g., handle storage input/output (I/O) operations to data objects stored in the local storage resources as part of the VSAN 102) by other host computers 104 in the cluster 106 or any software entities, such as VMs 124, running on the host computers in the cluster. As an example, the VSAN module of each host computer allows any VM running on any of the host computers in the cluster to access data stored in the local storage resources of that host computer, which may include virtual disks (or portions thereof) of VMs running on any of the host computers and other related files of those VMs. In addition to these VM I/Os, the VSAN module may handle other types of storage I/Os, such as namespace I/Os, recovery or resynchronization (resync) I/Os, and internal metadata I/O. Namespace I/Os are writes and read operations for configuration files for VMs, such as vmx files, log files, digest files and memory snapshots. Resync I/Os are writes and read operations for data related to failed disks, host computers, racks or clusters. Internal metadata I/Os are writes and read operations that are performed on internal data structures other than actual data, such as operations to read from logs, bitmaps, or policies.

Figure 2:
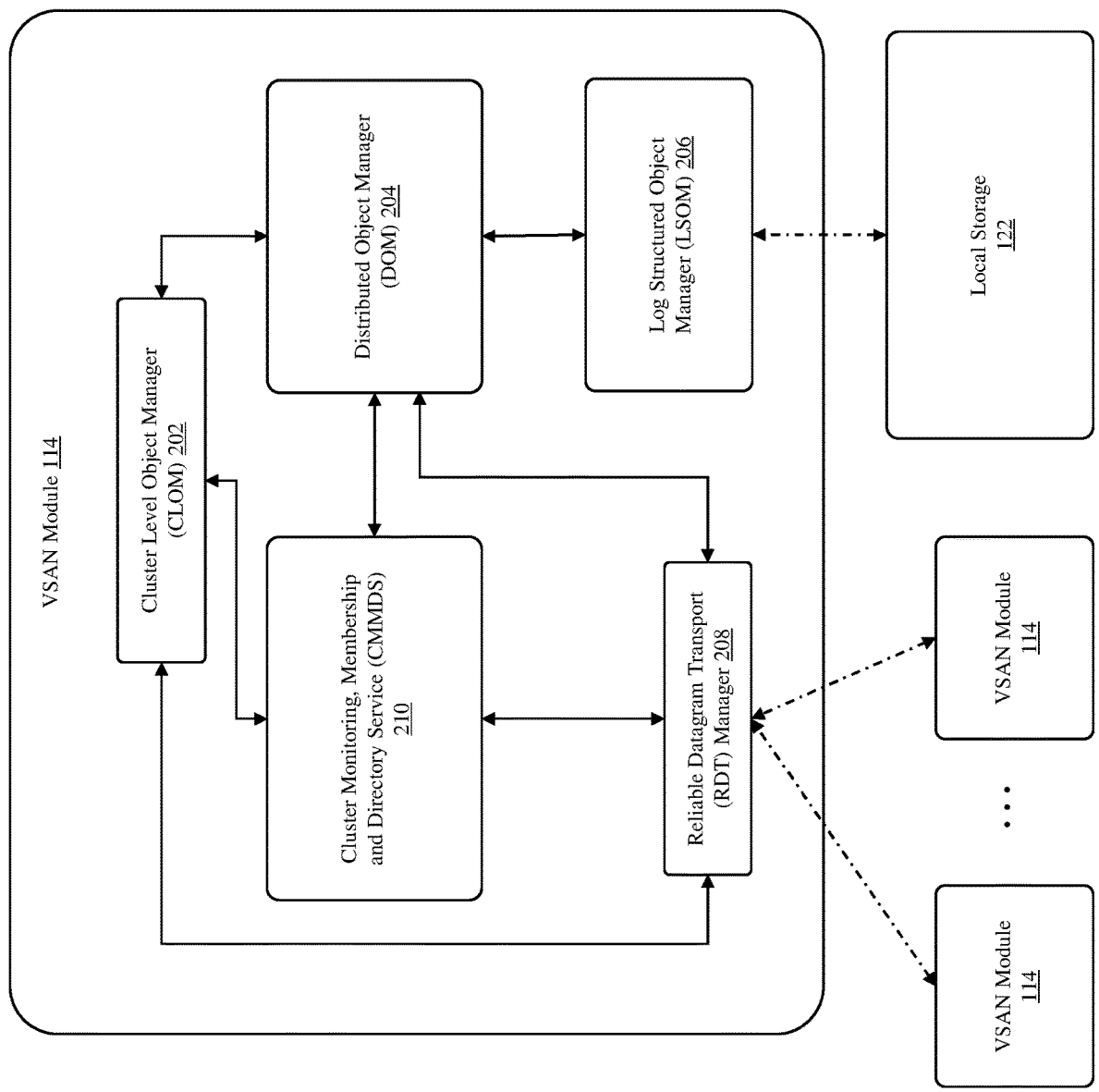
FIG. 2 is a block diagram of a virtual storage array network (VSAN) module in each host computer of the distributed storage system in accordance with an embodiment of the invention.

Turning now to FIG. 2, components of the VSAN module 114, which is included in each host computer 104 in the cluster 106, in accordance with an embodiment of the invention are shown. As shown in FIG. 2, the VSAN module includes a cluster level object manager (CLOM) 202, a distributed object manager (DOM) 204, a local log structured object management (LSOM) 206, a reliable datagram transport (RDT) manager 208, a cluster monitoring, membership and directory service (CMMDS) 210. These components of the VSAN module may be implemented as software running on each of the host computers in the cluster.

The CLOM 202 operates to validate storage resource availability, and DOM 204 operates to create components and apply configuration locally through the LSOM 206. The DOM also operates to coordinate with counterparts for component creation on other host computers 104 in the cluster 106. All subsequent reads and writes to storage objects funnel through the DOM 204, which will take them to the appropriate components. The LSOM operates to monitor the flow of storage I/O operations to the local storage 122, for example, to report whether a storage resource is congested. In an embodiment, the LSOM generates a congestion signal that indicates current storage usage, such as the current tier-1 device resource fullness. The RDT manager 208 is the communication mechanism for storage I/Os in a VSAN network, and thus, can communicate with the VSAN modules in other host computers in the cluster. The RDT manager uses transmission control protocol (TCP) at the transport layer and it is responsible for creating and destroying TCP connections (sockets) on demand. The CMMDS 210 is responsible for monitoring the VSAN cluster's membership, checking heartbeats between the host computers in the cluster, and publishing updates to the cluster directory. Other software components use the cluster directory to learn of changes in cluster topology and object configuration. For example, the DOM uses the contents of the cluster directory to determine the host computers in the cluster storing the components of a storage object and the paths by which those host computers are reachable.

Figure 3:
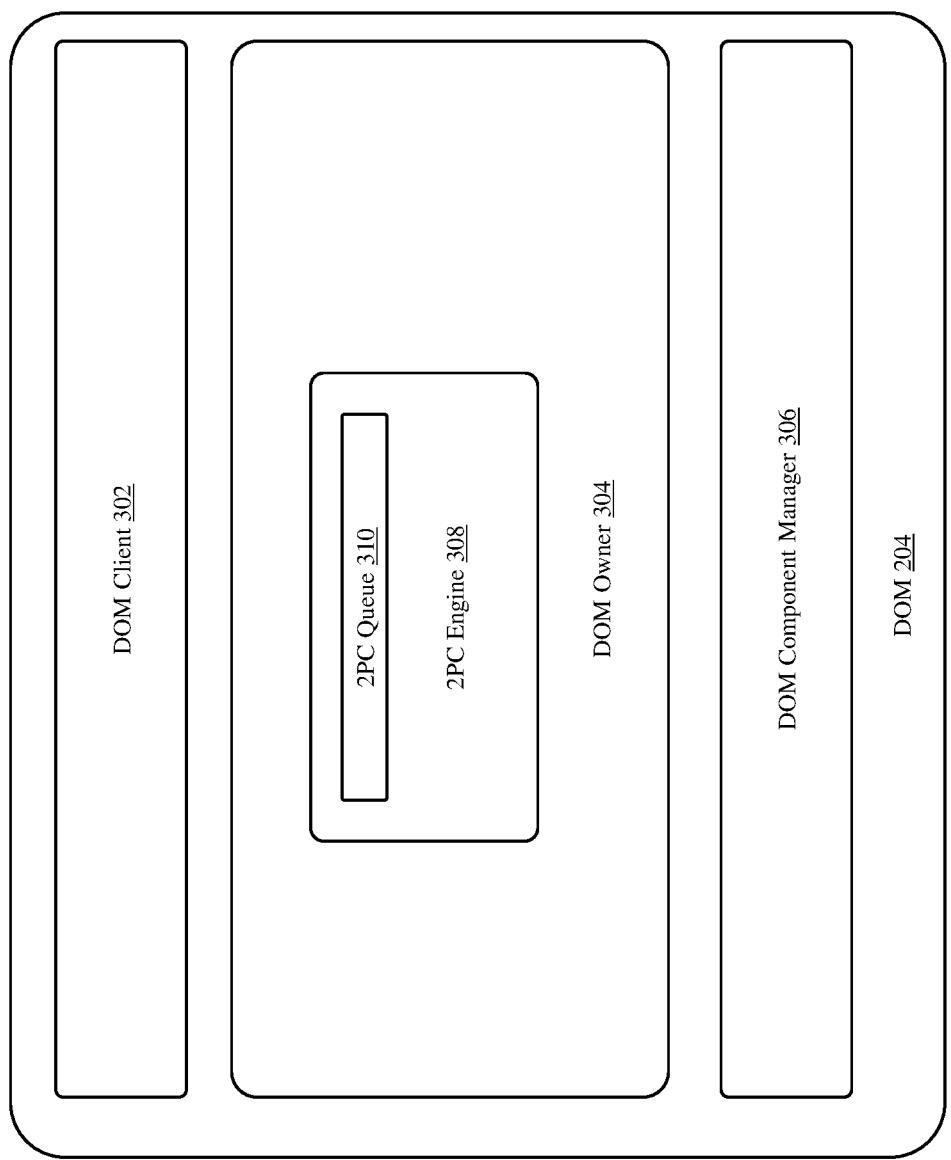
FIG. 3 is a block diagram of a distributed object manager (DOM) in the VSAN module shown in FIG. 2 in accordance with an embodiment of the invention.

Turning now to FIG. 3, components of the DOM 204 in accordance with an embodiment of the invention are shown. The DOM 204 includes a DOM client 302, a DOM owner 304 and a DOM component manager 306. The DOM client 302 performs the input/output operations to a storage object on behalf of a particular virtual machine. The DOM owner 304 manages access to a storage object, i.e., determines which processes are allowed to send I/O to the object. Each storage object in the distributed storage system 100 includes a DOM owner and a DOM client. The DOM owner for a storage object is responsible to handle all I/O requests to that object by locating the distributed components of the object and redirecting the I/O requests to the respective components. The DOM owner distributes data over different host computers through the DOM component manager, which is the local component of the DOM that connects with the LSOM 206 on each host computer. The DOM component manager is responsible for managing storage objects on host computers where their components exist.

As shown in FIG. 3, the DOM owner 304 includes a two-phase commit (2PC) engine 308 that performs 2PC operations for storage I/O requests being managed by the DOM owner 304. The 2PC engine 308 uses a 2PC queue 310 to execute prepare and commit process for the 2PC operations.

The prepare process executed by the 2PC engine 308 involves assigning at least one log sequence number (LSN), or any sequence value that comprises characters and/or numbers, to each of the storage I/O requests being processed and adding the storage I/O requests to the 2PC queue 310, which may involve appending the storage I/O requests to the 2PC queue. The prepare process for a particular storage I/O request is completed when that storage I/O request is sent to the DOM component manager 306 and an OK status for the request is returned, which means that the particular storage I/O request in the 2PC queue is now in the prepared state. Prior to being in the prepared state, a storage I/O request in the 2PC queue is in the preparing state. Thus, the prepared state of a storage I/O request is switched from the preparing state when the LSOM returns an OK code for the request upon completion.

The commit process executed by the 2PC engine 308 involves processing the storage I/O requests in the 2PC queue sequentially starting from the storage I/O request with the lowest LSN in the 2PC queue 310. The commit process involves committing all the storage I/O requests in the 2PC queue that are successfully prepared by finding any prepared storage I/O requests in the head of the 2PC queue, which are also consecutive. Any storage I/O requests that are not successfully prepared will be removed from the 2PC engine and retried by the caller.

If the 2PC engine 308 executes the prepare process in a conventional manner, where storage I/O requests are sequentially assigned new LSNs, I/O bottlenecks may occur due to one class of storage I/O requests being prepared slower than other classes of storage I/O requests, which would cause unfairness for the other classes of storage I/O requests. The major drawback of the conventional sequential commit method is that, not only does it make the system unfair for the faster I/Os, but it always makes the system underutilized. Unlike in other systems where unfairness works toward both ways (may underutilize or overutilize the system), this drawback only makes the system run slower, which is the worse side of the unfairness problem it creates.

The reason for this unfairness scenario is that the 2PC operation has requirements and limitations in the distributed storage system 100. First, the 2PC queue 310 is a limited resource because the DOM owner 304 may need to limit its resource usage and also coordinate with lower level stack for a bound outstanding I/O count. Second, the 2PC operation needs to batch the commit of update I/Os (e.g., writes and unmaps) to amortize the cost in both the DOM 204 and the LSOM 206. Third, the 2PC operation is retrospective so that any committed storage I/O request of a particular LSN implies that any storage I/O request with a lower LSN than the particular LSN has also been committed.

The above constraints mean that in order to commit as many storage I/O requests as possible in one batch, only the first N I/O requests in the 2PC queue that are all in prepared state can be committed. This design just uses the last storage I/O request of these continuously prepared elements in the list from its head, implying to the LSOM 206 that all that is before it must also be committed.

Thus, if any storage I/O request in the 2PC queue 310 is delayed due to other component's behavior (e.g., network, or the LSOM 206), it will cause every storage I/O requests after the delayed storage I/O request to be delayed as well. This delay will translate to a delay in commit, which also means, if the 2PC queue 310 is full, no more storage I/O requests can be consumed by the 2PC queue to even perform the prepare process.

Figure 4A:
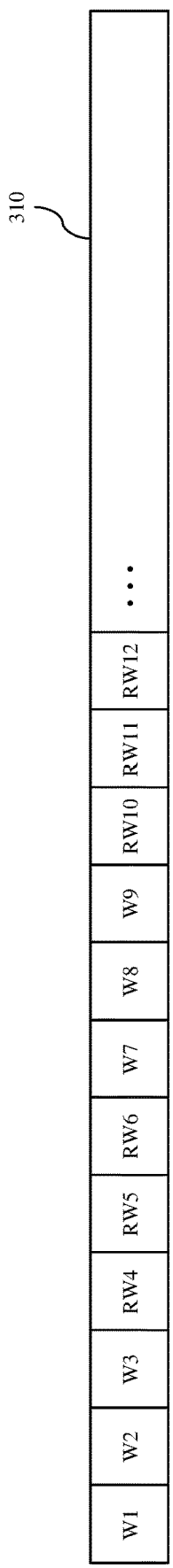
FIG. 4A illustrates resync writes (RW) and other writes (W) in a two-phase commit queue in the DOM when reserved log sequence numbers are not used.

Thus, if a single class of storage I/O requests tends to be delayed more often than other classes of storage I/O requests in the 2PC queue 310, all the storage I/O requests would be impacted. As an example, resync writes may be delayed more often in the 2PC queue 310 than other writes due to various reasons, including design choices, e.g., VM writes may be preferentially treated over resync writes in the DOM 204, or more specifically, in its DOM component manager 306. Thus, if the 2PC queue 310 includes interweaving resync writes and other writes, some of the earlier-arrived resync writes in the 2PC queue may delay the later-arrived other writes. This is illustrated in FIG. 4A, which shows the 2PC queue 310 with background resync writes (RW) and other foreground guest writes (W). The number for each write represents an LSN.

In FIG. 4A, the 2PC queue includes W1, W2, W3, RW4, RW5, RW6, W7, W8, W9, RW10, RW11 and RW12. In this illustrated example, let's assume that RW4 is in the preparing state and W7, W8 and W9 are in the prepared state. Since RW4 has a sequence number smaller than the sequence numbers of W7, W8 and W9, a slowdown of RW4 alone will cause W7, W8 and W9 to be blocked from being committed even though W7, W8 and W9 are already in the prepared state. This type of situation will result in unfairness of I/O performance and poor storage performance.

The 2PC engine 308 alleviates this issue by assigning a reserved pool or batch of LSNs for each of the storage I/O requests for the slower class, e.g., resync writes, in addition to the LSN for that storage I/O request, where the reserved LSNs are smaller than the LSN for the storage I/O request. The reserved batch of LSNs assigned to the storage I/O requests for the slower class are then used by the storage I/O requests of the other classes so that most of these storage I/O requests are not unduly delayed by the storage I/O requests for the slower class. Thus, for each of the storage I/O requests of the other classes, an available reserved LSN from a preparing storage I/O request of the slower class with the lowest LSN is assigned to that storage I/O request of the other classes. Thus, this storage I/O request of the other classes will have an LSN smaller than the LSN of the storage I/O request of the slower class, which means that this storage I/O request of the other classes can be committed even if the preparing storage I/O request of the slower class with the lowest LSN is delayed for some reason. In an embodiment, the order of the commit of each storage I/O request in the 2PC engine can actually change based on when each storage I/O request completes preparing, because upper level has a range map mechanism that protects overlapping access of the same region on the object's address space.

For example, in the example shown in FIG. 4A, if each of the resync writes (RWs) are assigned with a batch of ten (10) LSNs, where the last LSN (i.e., highest LSN in the batch of 10 LSNs) is used by that resync write, and the remaining nine (9) LSNs are used as reserved LSNs associated with that resync write, then the writes (Ws) following the RWs can be assigned using the reserved LSNs. The 2PC queue 310 before the forth write (W) will include three Ws and three resync writes (RWs), where each of RWs will have nine (9) reserved LSNs, as illustrated in FIG. 4B.

Figure 4B:
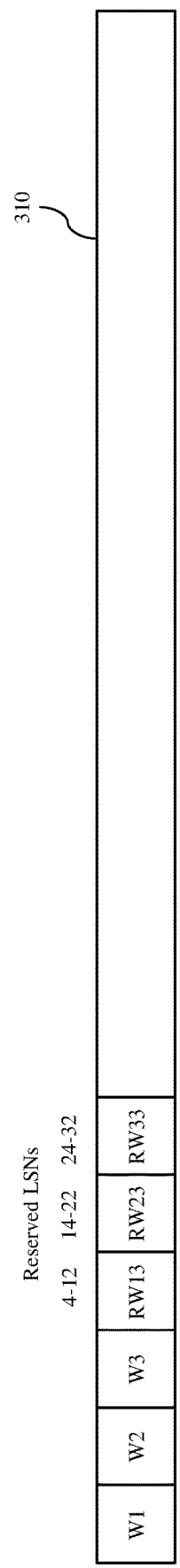
FIG. 4B illustrates RWs in the two-phase commit queue when reserved log sequence numbers are used in accordance with an embodiment of the invention.
Figure 4C:
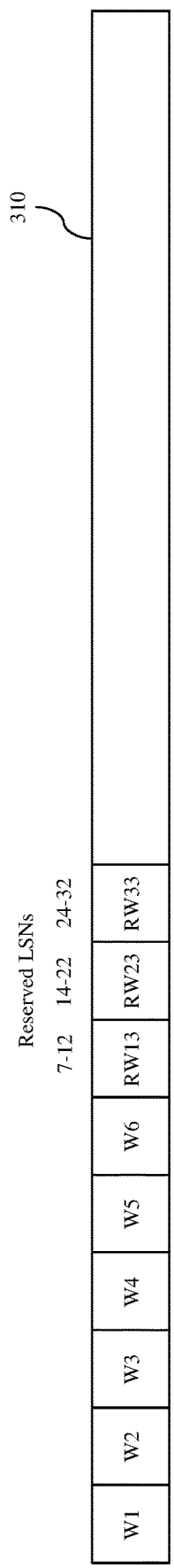
FIG. 4C illustrates Ws being processed after RWs with reserved log sequence numbers when reserved log sequence numbers are used in accordance with an embodiment of the invention.
Figure 4D:
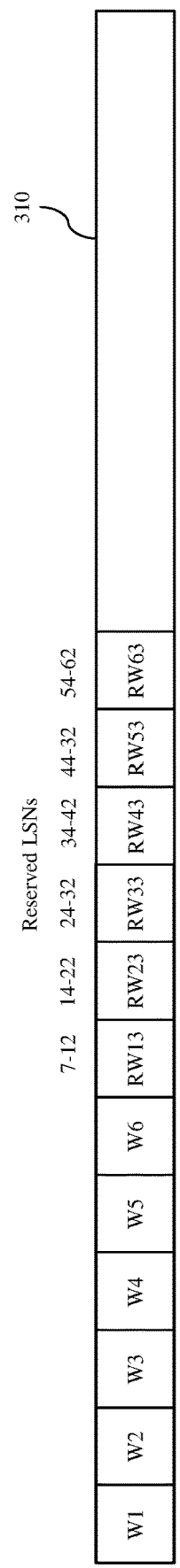
FIG. 4D illustrates the same RWs and Ws shown in FIG. 4A in the two-phase commit queue when reserved log sequence numbers are used in accordance with an embodiment of the invention.

As shown in FIG. 4B, the first three Ws have the same LSNs of 1, 2 and 3, respectively, as in FIG. 4A. However, the three RWs have LSNs of 13, 23 and 33, respectively. Thus, RW4, RW5 and RW6 of FIG. 4A are now RW13, RW23 and RW33 in FIG. 4B. Moreover, RW13 is assigned or associated with nine (9) LSNs, i.e., 4-12, RW23 is assigned or associated with nine (9) LSNs, i.e., 14-22, and RW33 is assigned or associated with nine (9) LSNs, i.e., 24-32. In an embodiment, the assignment of the reserved LSNs to the different RWs can be maintained by the 2PC engine 308. When the next three Ws are processed by the 2PC engine 308, these Ws will be assigned LSNs 4, 5 and 6, assuming that RW13 is in the preparing state, as illustrated in FIG. 4C. Consequently, these Ws will have LSNs that are smaller than the LSN of RW14. Thus, these Ws, i.e., W4, W5 and W6, will not be delayed due to RW13, which now have six reserved LSNs, i.e., 7-12. FIG. 4D shows the same Ws and Rs shown in FIG. 4A using reserved LSNs in accordance with an embodiment of the invention. Thus, all the Ws have LSNs smaller than the RWs, which means that the Ws will be committed without being blocked by any of the RWs.

In FIGS. 4A-4D, the Ws and RWs were rearranged in the 2PC queue 310 based on their LSNs. However, in some implementations, the Ws and RWs may be appended to the 2PC queue 310 as each of these writes is processed by the 2PC engine 308. Thus, in these implementations, the order of the writes in the 2PC queue 310 will not be based on the LSNs.

The two-phase commit operation executed by the 2PC engine 308 using reserved LSNs is described below. However, the prepare and commit processes of a two-phase commit operation without using reserved LSNs is first described. This is because the new proposed prepare algorithm using reserved LSNs still maintains the total order of the 2PC engine's I/O requests based on LSN values. In this description of the processes of two-phase commit operations with or without using reserved LSNs, resync write requests will be used as an example of a slower class of storage I/O requests and all other write requests will be used as an example of a faster class of storage I/O requests.

Figure 5:
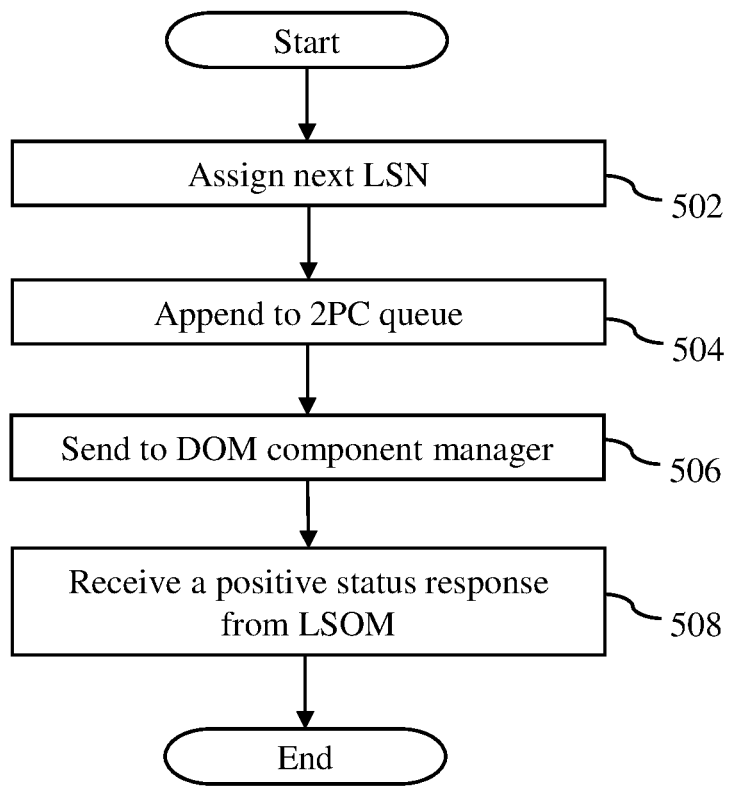
FIG. 5 is a prepare process of a two-phase commit operation that can be executed by a two-phase commit engine in the DOM without using reserved log sequence numbers.

A prepare process of a two-phase commit operation that can be executed by the 2PC engine 308 without using reserved LSNs is described with reference to a flow diagram of FIG. 5. The prepare process begins at step 502, where the next LSN is assigned to the next storage I/O request to be processed. Next, at step 504, the storage I/O request is appended or added to the 2PC queue 310. The storage I/O request is now in the preparing state. Next, at step 506, the storage I/O request is sent to the DOM component manager 306 for further processing. Next, at step 508, a positive status response from the LSOM, e.g., a return code of OK, is received by the 2PC engine. The storage I/O request is now in the prepared state. The process then comes to an end. If a positive status response is not received, which indicates a failed prepare, the process will be retried by the upper level code stack.

Figure 6:
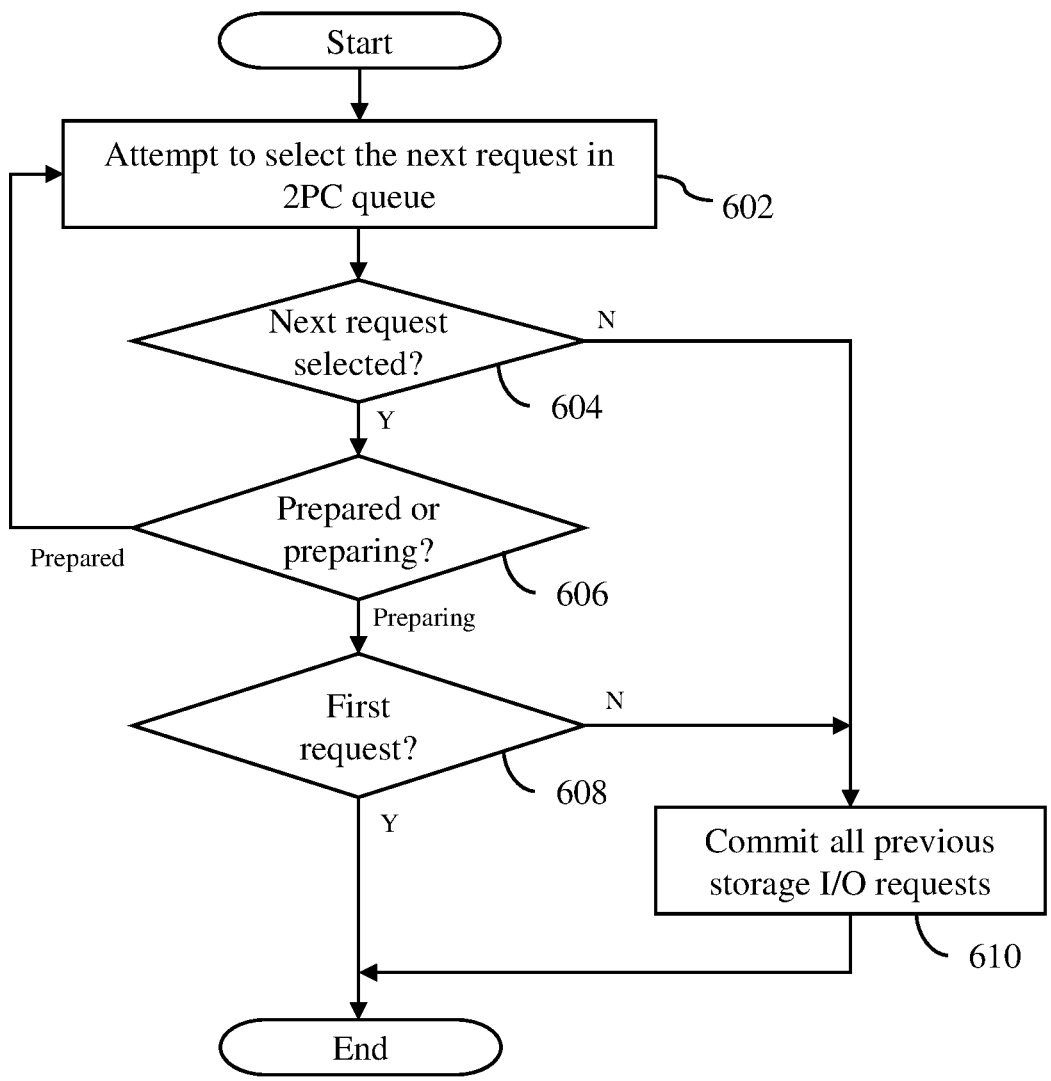
FIG. 6 is a commit process of the two-phase commit operation that can be executed by the two-phase commit engine.

A commit process of the two-phase commit operation that can be executed by the 2PC engine is described with reference to a flow diagram of FIG. 6. The commit process can be executed periodically or continuously, which may depend on the amount of storage I/O requests that need to be processed. The commit process begins at step 602, where an attempt is made to select the next storage I/O request in the 2PC queue. Next, at step 604, a determination is made whether the next storage I/O request has been selected. If no, because there are no more storage I/O requests in the 2PC queue 310, then the process proceeds to step 610, where all previous storage I/O requests in the 2PC queue 310, if any, are committed. Previous storage I/O requests are storage I/O requests with smaller LSNs than the LSN of the current storage I/O request being processed. The process then comes to an end. However, at step 604, if a determination is made that the next storage I/O request has been selected, then the process proceeds to step 606.

At step 606, a determination is made whether the selected storage I/O request is in a prepared state or in a preparing state. If the selected storage I/O request is in the prepared state, the process proceeds back to step 602 to try to select the next storage I/O request in the 2PC queue 310 to be processed.

However, if the selected storage I/O request is in the preparing state, then the process proceeds to step 608, where a determination is made whether this storage I/O request is the first storage I/O request in the 2PC queue being processed for the commit process. If the storage I/O request is the first storage I/O request, then the process comes to an end. However, if the storage I/O request is not the first storage I/O request, then the process proceeds to step 610, where all the previous storage I/O requests in the 2PC queue 310 are committed. The process then comes to an end.

Figure 7:
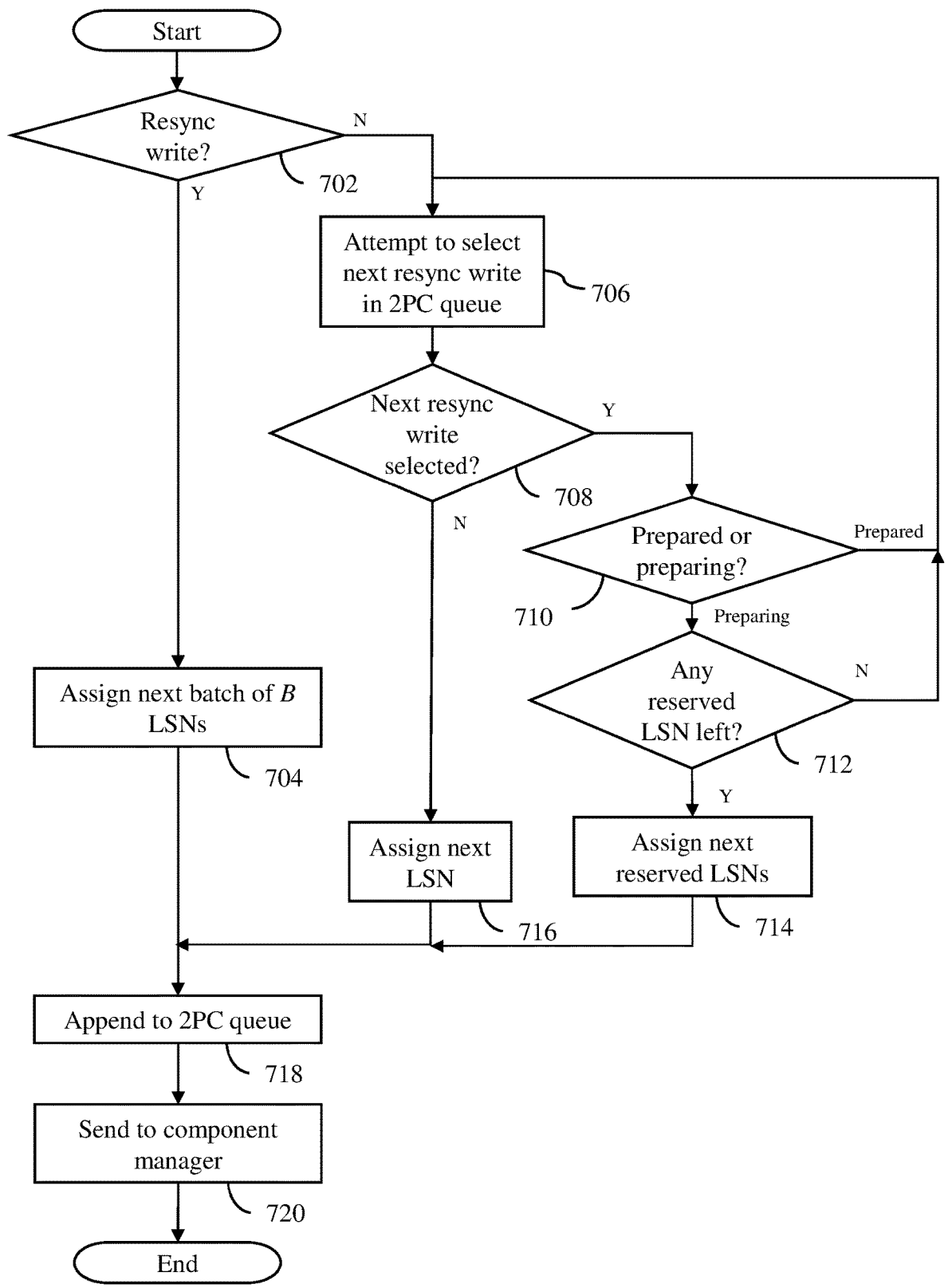
FIG. 7 is a prepare process of a two-phase commit operation executed by the two-phase commit engine in the DOM using reserved log sequence numbers in accordance with an embodiment of the invention.

In contrast to the prepare process shown in FIG. 5 and described above, a prepare process of the two-phase commit operation executed by the 2PC engine 308 using reserved LSNs in accordance with an embodiment of the invention is described with reference to a flow diagram of FIG. 7. The prepare process begins at step 702, where a determination is made whether the storage I/O request being processed is a resync write request. If yes, then the storage I/O request is assigned the next batch of B LSNs, where B is the batch size, at step 704. As an example, B may be ten thousand (10,000). For the assigned B LSNs, the first B-1 LSNs are used as reserved LSNs associated with the current storage I/O request, i.e., the current resync write request, and the last LSN of the B LSNs is used by the current storage I/O request. Next, at step 718, the storage I/O request is appended or added to the 2PC queue 310. Next, at step 720, the storage I/O request is sent to the DOM component manager 306.

Turning back to step 702, if the current storage I/O request is not a resync write request, then the process proceeds to step 706, where an attempt is made to select the next resync write request in the 2PC queue 310. Next, at step 708, a determination is made whether the next resync write request has been selected. If no, because there are no more resync write requests in the 2PC queue 310, then the process proceeds to step 716, where the next LSN is assigned to the current storage I/O request, i.e., non-resync write request. The process then proceeds to step 718, where the current storage I/O request is appended or added to the 2PC queue 310 to be sent to the DOM component manager 306.

However, if it is determined at step 708 that the next resync write request has been selected, the process proceeds to step 710, wherein a determination is made whether the selected resync write request is in the prepared state or in the preparing state. If the resync write request is in the prepared state, then the process proceeds back to step 706 to attempt to find another resync write request in the 2PC queue 310.

However, if the resync write request is in the preparing state, then the process proceeds to step 712, where a determination is made whether there is any available reserved LSN associated with the resync write request, i.e., any unused or open reserved LSN associated with the resync write request. If no reserved LSN is left for the resync write request, then the process proceeds back to step 706 to select the next resync write request in the 2PC queue 310, if any. If there is a reserved LSN left for the resync write request, then the process proceeds to step 714, where the current storage I/O request, i.e., the current non-resync write request, is assigned the next reserved LSN associated with the selected resync write request, which is the available reserved LSN with the lowest value. The process then proceeds to step 718, where the current storage I/O request is appended or added to the 2PC queue 310 to be sent to the DOM component manager 306. The used reserved LSN will be marked as being no longer available for use.

In this manner, the non-resync write requests in the 2PC queue 310 will typically be prepared earlier than the resync write requests, and thus, delays caused by resync write requests in the 2PC queue are significantly reduced. The same commit process shown in FIG. 6 and described above may be used with this prepare process using reserved LSNs to commit the write requests in the 2PC queue 310. In an embodiment, the orders of storage I/O requests within the 2PC engine 308 can be rearranged and does not affect higher level I/O correctness and semantics (e.g., which write should be performed before or after which), because an upper level range map guarantees the nonoverlappingness of the I/Os queued in the 2PC engine.

In some embodiments, the batch size of reserved LSNs for each resync write request (the value B in step 704) is adjusted to optimize the use of the reserved LSNs for non-resync write requests. In these embodiments, the utilization of the reserved LSNs for non-resync write requests is monitored by the 2PC engine 308 to dynamically adjust the batch size of reserved LSNs for each resync write request. The batch size of reserved LSNs may be increased by a certain amount or percentage when all the reserved LSNs for one or more resync write requests in the 2PC queue 310 are exhausted or completely used by non-resync write requests. As an example, the batch size of reserved LSNs may be increased by ten percent (10%) for subsequent resync write requests if the reserved LSNs for one or more resync write requests in the 2PC queue 310 have been exhausted. Similarly, the batch size of reserved LSNs may be decreased by a certain amount or percentage when too many reserved LSNs for one or more resync write requests are not utilized. As an example, the batch size of reserved LSNs may be decreased by ten percent (10%) for subsequent resync write requests if the number of unused reserved LSNs for one or more resync write requests in the 2PC queue 310 exceeds a threshold, for example, half of the reserved LSNs for each resync write request. This analysis may be performed periodically, for example, every second, to increase or decrease the batch size of reserved LSNs for each resync write request to achieve sufficient fairness without wasting too much resources. In some implementations, consecutive increases or decreases may be done linearly or exponentially. In an embodiment, step 706 can be made a stateful function, not only inside one walk-through of the flow, but also on re-entry, i.e., the 2PC engine 308 remembers all the past visited recovery or resync writes that are in preparing or having used up all their reserved LSNs. In other words, it will skip right to the first prepared recovery write with remaining reserved LSNs for consumption, which is a major performance optimization.

In this description of the processes of two-phase commit operations with or without using reserved LSNs, resync write requests were used as an example of a slower class of storage I/O requests and all other write requests were used as an example of a faster class of storage I/O requests. In other embodiments, different types of storage I/O requests may be designated as a slower class of storage I/O requests. In these embodiments, the type of storage I/O requests that has been determined to be a slower class will be processed in the same manner as described above with respect to resync write requests.

As an example, rather than resync write requests being designated as a slower class of write requests, write requests from a particular host computer may be designated as a slower class of write requests. In this example, the write requests from the particular host computer may be processed in the same manner as described above with respect to resync write requests, i.e., these write requests will be assigned with a batch or pool of LSNs. The write requests from all other host computers will be processed in the same manner as described above with respect to non-resync write requests, i.e., these write requests will use reserved LSNs, if available.

Thus, in some embodiments, the speed of various types of storage I/O requests are monitored by the 2PC engine 308 to determine if there is a class of storage I/O requests that are usually slower than other storage I/O requests, and thus, blocking the other storage I/O requests in the 2PC queue 310. Once the slower class of storage I/O requests is determined, then these storage I/O requests in the slower class will be processed in the same manner as described above with respect to resync write requests during the prepare process.

There are other possible approaches to try to address the delay in a 2PC queue due to slower storage I/O requests. However, these other approaches have various challenges, which makes them undesirable. As an example, LSN shuffle may be coordinated with the LSOM 206 to give faster storage I/O requests smaller LSNs. However, given that this approach will mostly be applied in a large-scale distributed system, this approach will probably have another performance impact if one or more round trips of coordination is applied between the DOM 204 and the LSOM 206 in the 2PC I/O path. In addition, dealing with failure events in the communication path may also add complexities to the design. As another example, a chase operation piggybacked on normal storage I/O requests may be implemented to notify the component level I/O scheduler to prioritize the slow operations blocking others. The response time of this approach might be higher than the reserved LSN approach described herein. However, such approach may conflict with the desired prioritization, as well as present implementation challenges. Another example is, from the source, decreasing the number of queued recovery or resync writes, based on the congestion from the LSOM side. However, this approach does not solve the problem of delays caused by the network. Still another approach is to increase the resource limit of the DOM owner 304. However, the resource limit will always be reached because workloads will try to fully utilize the storage, and thus, the unfairness issue will not be resolved in the long run.

Figure 8:
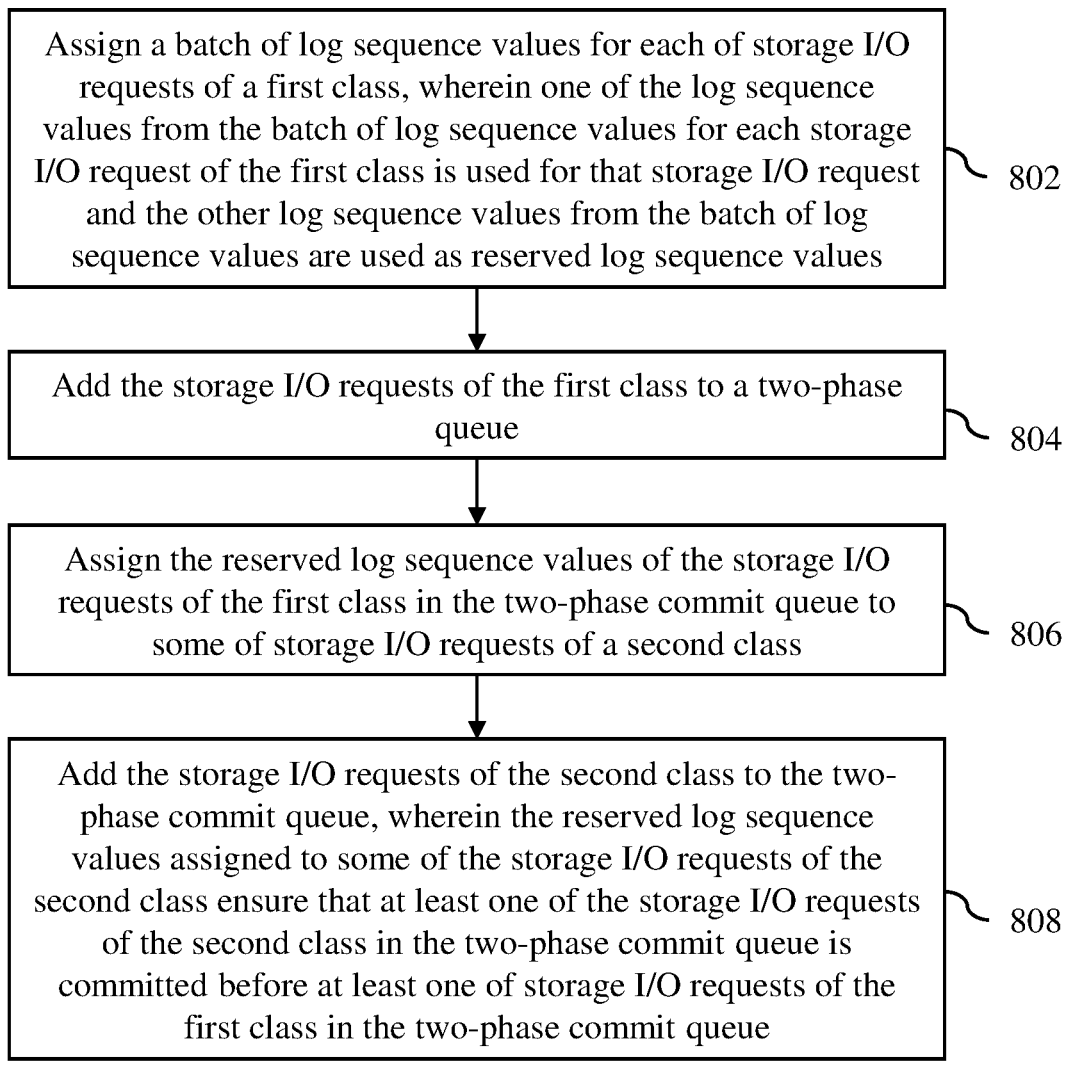
FIG. 8 is a flow diagram of a method of managing different classes of storage input/output (I/O) requests for a two-phase commit operation in a distributed storage system in accordance with an embodiment of the invention.

A computer-implemented method for managing different classes of storage input/output (I/O) requests for a two-phase commit operation in a distributed storage system in accordance with an embodiment of the invention is described with reference to a flow diagram of FIG. 8. At block 802, a batch of log sequence values is assigned to each of storage I/O requests of a first class. In this embodiment, one of the log sequence values from the batch of log sequence values for each storage I/O request of the first class is used for that storage I/O request and the other log sequence values from the batch of log sequence values are used as reserved log sequence values. At block 804, the storage I/O requests of the first class are added to a two-phase queue. At block 806, the reserved log sequence values of the storage I/O requests of the first class in the two-phase commit queue are assigned to some of storage I/O requests of a second class. At block 808, the storage I/O requests of the second class are add to the two-phase commit queue. The reserved log sequence values assigned to some of the second storage I/O requests of the second class ensures that at least one of the storage I/O requests of the second class in the two-phase commit queue is committed before at least one of storage I/O requests of the first class in the two-phase commit queue.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, non-volatile memory, NVMe device, persistent memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method, comprising:
assigning, by a virtual storage area network (VSAN) module of a first host computer, a batch of log sequence values for each of a plurality of storage I/O requests of a first class, wherein the host computer is one of a plurality of host computers in a cluster, the cluster comprising a VSAN that uses local storage resources of one or more of the plurality of host computers, including the first host computer, as a distributed storage system, and one of the log sequence values from the batch of log sequence values for each storage I/O request of the first class is used for that storage I/O request and the other log sequence values from the batch of log sequence values are used as reserved log sequence values;
adding, by the VSAN module, the storage I/O requests of the first class to a two-phase commit queue;
assigning, by the VSAN module, the reserved log sequence values of the storage I/O requests of the first class in the two-phase commit queue to some of a plurality of storage I/O requests of a second class; and
adding, by the VSAN module, the storage I/O requests of the second class to the two-phase commit queue, wherein the reserved log sequence values assigned to some of the storage I/O requests of the second class ensure that at least one of the storage I/O requests of the second class in the two-phase commit queue is committed before at least one of storage I/O requests of the first class in the two-phase commit queue.

2. The method of claim 1, wherein assigning the batch of log sequence values for each storage I/O request of the first class includes using a highest log sequence value from the batch of log sequence values for that particular storage I/O request of the first class.

3. The method of claim 1, further comprising changing a size of a batch of log sequence values assigned to a subsequent storage I/O request of the first class based on utilization of reserved log sequence values of the storage I/O requests of the first class.

4. The method of claim 3, wherein changing the size of the batch of log sequence values comprises:
increasing the number of log sequence values in the batch of log sequence values assigned to the subsequent storage I/O request of the first class when reserved log sequence values assigned to at least one storage I/O request of the first class in the two-phase commit queue are exhausted; or decreasing the number of log sequence values in the batch of log sequence values assigned to the subsequent storage I/O request of the first class when reserved log sequence values assigned to at least one storage I/O request of the first class in the two-phase commit queue that are available exceeds a threshold.

5. The method of claim 1, wherein:

the first host computer executes a hypervisor that enables sharing of hardware resources of the first host computer by one or more virtual instances running on the first host computer;

the hypervisor comprises the VSAN module; and the VSAN module allows virtual instances running on other host computers in the cluster to access data stored in the local storage resources of the first host computer.

6. The method of claim 1, wherein assigning the reserved log sequence values includes selecting a specific storage I/O request of the first class in the two-phase commit queue that is in a preparing state with the smallest log sequence value among the storage I/O requests of the first class, and determining whether there is any available reserved log sequence value assigned to the specific storage I/O request of the first class.

7. The method of claim 6, wherein assigning the reserved log sequence values includes, when there is no available reserved log sequence value assigned to the specific storage I/O request of the first class, selecting another specific storage I/O requests of the first class in the two-phase commit queue that is in the preparing state with the second smallest log sequence value, and determining whether there is any available reserved log sequence value assigned to the another specific storage I/O request of the first class.

8. The method of claim 1, wherein the storage I/O requests of the first class are resynchronization write requests and the storage I/O request of the second class are non-resynchronization write requests.

9. The method of claim 1, wherein the storage I/O requests of the first class are storage I/O requests from the first host computer and the storage I/O request of the second class are storage I/O requests from other host computers in the cluster.

10. A non-transitory computer-readable storage medium containing program instructions executable by one or more processors of a computer system causes the one or more processors to perform steps operations comprising:

assigning, by a virtual storage area network (VSAN) module of a first host computer, a batch of log sequence values for each of a plurality of storage I/O requests of a first class, wherein the host computer is one of a plurality of host computers in a cluster, the cluster comprising a VSAN that uses local storage resources of one or more of the plurality of host computers, including the first host computer, as a distributed storage system, and one of the log sequence values from the batch of log sequence values for each storage I/O request of the first class is used for that storage I/O request and the other log sequence values from the batch of log sequence values are used as reserved log sequence values;

adding, by the VSAN module, the storage I/O requests of the first class to a two-phase commit queue;

assigning, by the VSAN module, the reserved log sequence values of the storage I/O requests of the first class in the two-phase commit queue to some of a plurality of storage I/O requests of a second class; and adding, by the VSAN module, the storage I/O requests of the second class to the two-phase commit queue, wherein the reserved log sequence values assigned to some of the storage I/O requests of the second class ensure that at least one of the storage I/O requests of the second class in the two-phase commit queue is committed before at least one of storage I/O requests of the first class in the two-phase commit queue.

11. The non-transitory computer-readable storage medium of claim 10, wherein assigning the batch of log sequence values for each storage I/O request of the first class includes using a highest log sequence value from the batch of log sequence values for that particular storage I/O request of the first class.

12. The non-transitory computer-readable storage medium of claim 10, wherein the steps further comprise changing a size of a batch of log sequence values assigned to a subsequent storage I/O request of the first class based on utilization of reserved log sequence values of the storage I/O requests of the first class.

13. The non-transitory computer-readable storage medium of claim 12, wherein changing the size of the batch of log sequence values comprises:

increasing the number of log sequence values in the batch of log sequence values assigned to the subsequent storage I/O request of the first class when reserved log sequence values assigned to at least one storage I/O request of the first class in the two-phase commit queue are exhausted; or decreasing the number of log sequence values in the batch of log sequence values assigned to the subsequent storage I/O request of the first class when reserved log sequence values assigned to at least one storage I/O request of the first class in the two-phase commit queue that are available exceeds a threshold.

14. The non-transitory computer-readable storage medium of claim 10, wherein:

the first host computer executes a hypervisor that enables sharing of hardware resources of the first host computer by one or more virtual instances running on the first host computer;

the hypervisor comprises the VSAN module; and the VSAN module allows virtual instances running on other host computers in the cluster to access data stored in the local storage resources of the first host computer.

15. The non-transitory computer-readable storage medium of claim 10, wherein assigning the reserved log sequence values includes selecting a specific storage I/O request of the first class in the two-phase commit queue that is in a preparing state with the smallest log sequence value among the storage I/O requests of the first class, and determining whether there is any available reserved log sequence value assigned to the specific storage I/O request of the first class.

16. The non-transitory computer-readable storage medium of claim 15, wherein assigning the reserved log sequence values includes, when there is no available reserved log sequence value assigned to the specific storage I/O request of the first class, selecting another specific storage I/O requests of the first class in the two-phase commit queue that is in the preparing state with the second smallest log sequence value, and determining whether there is any available reserved log sequence value assigned to the another specific storage I/O request of the first class.

17. The non-transitory computer-readable storage medium of claim 10, wherein the storage I/O requests of the first class are resynchronization write requests and the storage I/O request of the second class are non-resynchronization write requests.

18. The non-transitory computer-readable storage medium of claim 10, wherein the storage I/O requests of the first class are storage I/O requests from a the first host computer and the storage I/O request of the second class are storage I/O requests from other host computers in the cluster.

19. A computer system comprising:
memory; and
a processor configured to:
assigning, by a virtual storage area network (VSAN) module of a first host computer, a batch of log sequence values for each of a plurality of storage I/O requests of a first class, wherein the host computer is one of a plurality of host computers in a cluster, the cluster comprising a VSAN that uses local storage resources of one or more of the plurality of host computers, including the first host computer, as a distributed storage system, and one of the log sequence values from the batch of log sequence values for each storage I/O request of the first class is used for that storage I/O request and the other log sequence values from the batch of log sequence values are used as reserved log sequence values;

adding, by the VSAN module, the storage I/O requests of the first class to a two-phase commit queue;

assigning, by the VSAN module, the reserved log sequence values of the storage I/O requests of the first class in the two-phase commit queue to some of a plurality of storage I/O requests of a second class; and adding, by the VSAN module, the storage I/O requests of the second class to the two-phase commit queue, wherein the reserved log sequence values assigned to some of the storage I/O requests of the second class ensure that at least one of the storage I/O requests of the second class in the two-phase commit queue is committed before at least one of storage I/O requests of the first class in the two-phase commit queue.

20. The computer system of claim 19, wherein:

the first host computer executes a hypervisor that enables sharing of hardware resources of the first host computer by one or more virtual instances running on the first host computer;

the hypervisor comprises the VSAN module; and the VSAN module allows virtual instances running on other host computers in the cluster to access data stored in the local storage resources of the first host computer.

* * * * *